United States Patent
Previty et al.

(10) Patent No.: US 9,469,094 B2
(45) Date of Patent: Oct. 18, 2016

(54) SYSTEM AND METHOD FOR LABEL MATRIX STRIPPING

(71) Applicant: Avery Dennison Corporation, Glendale, CA (US)

(72) Inventors: Richard A. Previty, Chardon, OH (US); Alan Green, Greenwood, SC (US); Dennis R. Benoit, Simpsonville, SC (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/211,189

(22) Filed: Mar. 14, 2014

(65) Prior Publication Data
US 2014/0299278 A1 Oct. 9, 2014

Related U.S. Application Data

(60) Provisional application No. 61/791,259, filed on Mar. 15, 2013.

(51) Int. Cl.
| | |
|---|---|
| *B32B 38/10* | (2006.01) |
| *B32B 43/00* | (2006.01) |
| *B26D 7/18* | (2006.01) |
| *B31D 1/02* | (2006.01) |

(52) U.S. Cl.
CPC ............ *B32B 43/006* (2013.01); *B26D 7/18* (2013.01); *B31D 1/021* (2013.01); *B31D 1/026* (2013.01); *B32B 38/10* (2013.01); *Y10T 83/2074* (2015.04); *Y10T 156/1174* (2015.01); *Y10T 156/1184* (2015.01); *Y10T 156/1195* (2015.01); *Y10T 156/195* (2015.01); *Y10T 156/1967* (2015.01); *Y10T 156/1994* (2015.01)

(58) Field of Classification Search
CPC ............ B32B 38/10; B32B 43/006; Y10T 156/1174; Y10T 156/1184; Y10T 156/195; Y10T 156/1967; B26D 7/1836
USPC ............ 156/715, 717, 719, 759, 762, 767
See application file for complete search history.

(56) References Cited

U.S. PATENT DOCUMENTS

| | | | | |
|---|---|---|---|---|
| 3,522,136 | A * | 7/1970 | McCormick | B31D 1/021 156/384 |
| 4,246,058 | A * | 1/1981 | Reed | B26D 7/1827 156/183 |
| 4,469,550 | A * | 9/1984 | O'Steen, Jr. | B44C 1/105 156/235 |
| 4,699,679 | A * | 10/1987 | Held | B30B 5/06 100/154 |
| 5,725,713 | A * | 3/1998 | Fischer | B31D 1/021 156/247 |
| 6,349,756 | B1 * | 2/2002 | Brough | B29C 63/0013 156/247 |
| 6,592,693 | B1 * | 7/2003 | Nedblake | B23K 26/0846 156/247 |
| 2002/0108709 | A1 * | 8/2002 | Fukada | B65H 23/32 156/719 |
| 2002/0124948 | A1 * | 9/2002 | Mikkelsen | B08B 7/0028 156/247 |
| 2007/0074809 | A1 * | 4/2007 | Phillips | B31D 1/021 156/256 |
| 2008/0289746 | A1 * | 11/2008 | Pfitzner | B65H 18/103 156/193 |

(Continued)

*Primary Examiner* — Philip Tucker
*Assistant Examiner* — Nickolas Harm
(74) *Attorney, Agent, or Firm* — Avery Dennison Corporation

(57) ABSTRACT

An apparatus and method for removing matrix material from a web of cut adhesive backed labels. A matrix stripping apparatus comprises a rotating cylinder for receiving a web of cut adhesive labels, a source for applying an electrostatic charge to the web of cut adhesive labels, and a separation member to facilitate separation of the matrix from a web comprising cut labels and a release liner. Applying an electrostatic charge to the web assists in holding the web against the rotating cylinder and relieves tension in the separation and removal of the matrix material.

25 Claims, 9 Drawing Sheets

(56) References Cited

U.S. PATENT DOCUMENTS

| | | | |
|---|---|---|---|
| 2009/0025875 A1* | 1/2009 | Hagman | B32B 43/006 156/711 |
| 2009/0205781 A1* | 8/2009 | Merrill | B65C 9/42 156/715 |
| 2010/0108265 A1* | 5/2010 | Tillement | B65H 23/26 156/389 |
| 2011/0132522 A1* | 6/2011 | Green | B26D 7/10 156/80 |
| 2012/0018099 A1* | 1/2012 | Fortunati | C21D 6/008 148/208 |

* cited by examiner

SYSTEM AND METHOD FOR LABEL MATRIX STRIPPING

CROSS REFERENCE TO RELATED APPLICATION

The present application claims the benefit of U.S. Provisional Application No. 61/791,259 filed Mar. 15, 2013, which is incorporated herein by reference in its entirety.

BACKGROUND

Typical labels, including pressure sensitive labels, are manufactured from label stock that comprises a face layer (facestock), an adhesive (i.e., PSA) layer adhered to the face layer and a protective release liner removably adhered to the adhesive layer. The label stock is generally provided in roll form. Individual labels may be produced by die cutting the face layer and the PSA layer, and then removing the surrounding waste matrix, leaving the individual labels adhered to the release liner.

Matrix stripping is carried out by guiding the matrix and the rest of the construction in divergent paths. This is typically accomplished by use of a peel bar in conjunction with a driven idler roll (a capstan roll). Matrix stripping requires positive and certain separation of the matrix from the rest of the construction when the matrix and the rest of the construction are guided in divergent paths. Often, this cannot be achieved at increased line speeds or with more fragile or flexible material, such as with thinner facestock materials and weak matrix structures. Current methods for matrix stripping may employ the use of load cell rolls to measure and control tension and ensure positive and consistent pulling of the matrix away from the finished product and controlled tension on the finished product to pull the finished product away from the matrix. These systems, while effective, require reduced processing speeds to limit matrix breakage.

SUMMARY

The present invention provides an apparatus and method for removing matrix material from a web of cut adhesive backed labels. A matrix stripping apparatus comprises a rotating cylinder for receiving a web of cut adhesive labels, a source for applying an electrostatic charge to the web of cut adhesive labels, and a separation member to facilitate separation of the matrix from a web comprising cut labels and a release liner. Applying an electrostatic charge to the web assists in holding the web against the rotating cylinder.

The present technology provides an advantage over prior methods and system and allows for easier separation of the matrix from the cut label stock. Applying an electrostatic charge to the web of cut label stock assists in holding or pinning one of the faces of the label stock to a cylinder prior to applying suitable force to the opposite face to facilitate the directional change and delamination of the matrix material and the label/liner web. Holding a face of the label stock against the cylinder minimizes slippage of the web.

In one aspect, the present invention provides an apparatus for forming cut adhesive backed labels on a liner comprising: a cutting station for forming a plurality of cut adhesive backed labels and a surrounding matrix from a label stock comprising a facestock, an adhesive layer, and a liner; and a matrix removal station for removing the matrix from the cut adhesive backed labels and the liner, the matrix removal station comprising: a rotatable cylinder for receiving a cut label stock comprising the cut adhesive back labels, the matrix, and the liner; a source for applying an electrostatic charge to the cut label stock; a guiding member for guiding the matrix in a path divergent from the adhesive backed labels and the liner; and a member for neutralizing cut label stock bearing the adhesive backed labels and the liner from which the matrix has been removed.

In another aspect, the present invention provides a method of removing a matrix material from a web of cut label stock comprising providing a web of cut label stock to a rotating cylinder, the cut label stock comprising a facestock, cut label stock and a matrix, an adhesive layer in contact with the facestock, and a release liner in contact with the adhesive layer and opposite the facestock, where the facestock or the release liner contacts an outer surface of the cylinder; applying an electrostatic charge to the web of cut label stock in contact with the rotating cylinder; and contacting a surface of the cut label stock that is not in contact with the rotating cylinder with a separation member causing separation of the matrix from the cut label stock.

The drawings are for purposes of illustrating aspects and embodiments of the invention and are not intended to limit the invention to those specific embodiments. Aspects of the invention can be further understood with reference to the drawings and the following description.

DETAILED DESCRIPTION

Figure 1:
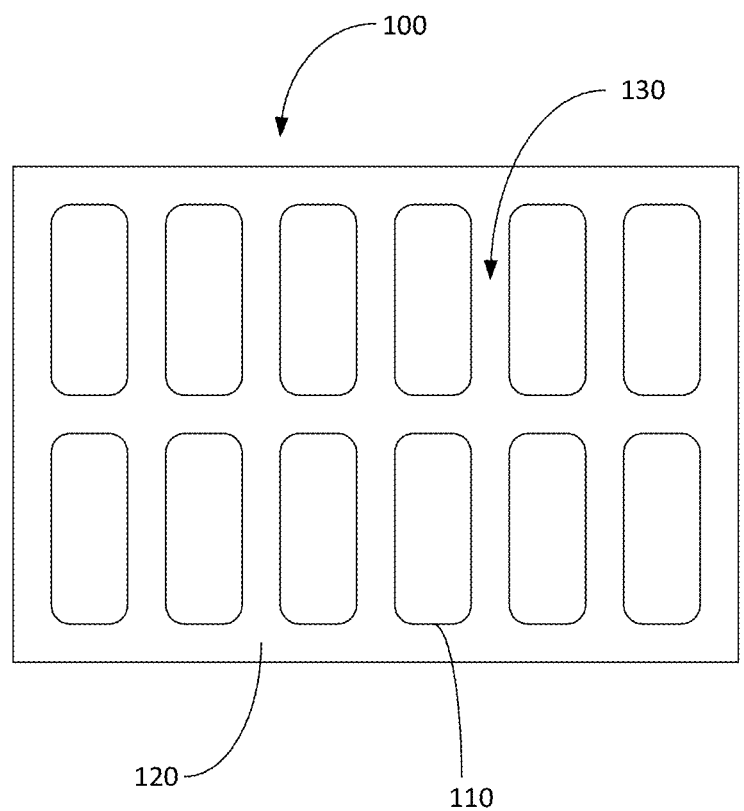
FIG. 1 is a top plan view of a sheet of cut label stock.

The present technology provides a system and method for the removal of matrix material produced during the die-cutting step in forming labels. The matrix material refers to the waste or trim surrounding the formed labels when they are die-cut. Referring to FIG. 1, the label sheet 100 comprises die-cut labels 110 and surrounding trim 120, which is also referred to as the matrix. The matrix comprises "rungs" or "bridges" 130 between successive labels.

The label constructions useful in the present invention comprise a facestock, a release liner, and an adhesive layer between the facestock and the liner. The facestock that is used in the label constructions may comprise any of a variety of materials known to those skilled in the art to be suitable as a facestock material. For example, the facestock may be comprised of such materials as paper (e.g., kraft, bond, offset, litho, and sulfite paper) with or without sizing, or polymeric materials suitable for facestock use such as polyolefins, polyesters, polyamides, etc. In one embodiment, the requirement for the facestock material is that it be capable of forming some degree of adhesive bond to an adhesive layer. In one embodiment, the facestock comprises a polymeric film that can form the desired bond and is capable of being printed. In yet another embodiment, the polymeric film material is one that, when combined with the adhesive layer, provides a sufficiently self-supporting construction to facilitate label dispensing (label separation and application). The surfaces of the facestock material can be surface treated, such as, for example, corona treated, flame treated, or top coat treated to improve performance in various areas such as printability, adhesion to the adhesive layer in contact with the facestock, etc. In one embodiment, the polymer film material is chosen to provide the label construction with one or more of the desired properties such as printability, die-cuttability, matrix-strippability, dispensability, etc.

The facestock can be a monolayer polymeric film facestock or it can comprise more than one polymer film layer, some of which may be separated by an internal adhesive layer. The thicknesses of each of the layers may be varied. Multilayer film facestocks may be prepared by techniques well known to those skilled in the art such as by laminating two or more preformed polymeric films (and, optionally an adhesive layer) together, or by the coextrusion of several polymeric films and, optionally, an adhesive layer. The multilayer facestock can be prepared also by sequential coating and formation of individual layers, triple die coating, extrusion coating of multiple layers onto an adhesive layer, etc.

The label constructions also include an adhesive layer having an upper surface and a lower surface wherein the upper surface of the adhesive layer is adhesively joined or adhered to the lower surface of the facestock. In some embodiments, as noted above, the constructions also contain an interior adhesive that can function as a lamination adhesive when laminating preformed polymeric films together to form a facestock. Alternatively or in addition to one or more polymeric film layer, the facestock may include layers of paper and foil. The internal adhesives can be a heat-activated adhesives, hot melt adhesives, or pressure sensitive adhesives (PSA). In one embodiment, the external (adhered to the facestock) adhesive is preferably a PSA. Adhesives that are tacky at any temperature up to about 160° C. (about 320° F.) are particularly useful. PSAs that are tacky at ambient temperatures are particularly useful in the adhesive constructions of the present invention. Ambient temperatures include room temperature and can range from 5 to 80° C., 10 to 70° C., or 15 to 60° C.

The adhesives can generally be classified into the following categories: random copolymer adhesives such as those based upon acrylate and/or methacrylate copolymers, alpha-olefin copolymers, silicone copolymers, chloroprene/acrylonitrile copolymers, and the like; and block copolymer adhesives including those based upon linear block copolymers (i.e., A-B and A-B-A type), branched block copolymers, star block copolymers, grafted or radial block copolymers, etc., and Natural and synthetic rubber adhesives. In an embodiment the adhesive of the adhesive layer is an emulsion acrylic-based pressure sensitive adhesive.

A description of useful pressure-sensitive adhesives may be found in Encyclopedia of Polymer Science and Engineering, Vol. 13. Wiley-Interscience Publishers (New York, 1988). Additional description of useful pressure-sensitive adhesives may be found in Encyclopedia of Polymer Science and Technology, Vol. 1, Interscience Publishers (New York, 1964).

The facestock can have a thickness of from about 0.25 mils (0.0064 mm) to about 10 mils (0.26 mm); about 1 mil (0.026 mm) to about 7.5 mils (0.19 mm); even about 2 mils (0.051 mm) to about 5 mils (0.13 mm). Here as elsewhere in the specification and claims, numerical values can be combined to form new and non-disclosed ranges.

The label stock can comprise a heavy weight liner or a thin, light weight liner. The thickness of the thin liner is less than the standard 2.5 mils (0.064 mm). The thickness of the liner can be less than 2.2 mils (0.060 mm), less than 2.0 mils (0.051 mm), less than 1.8 mils (0.042 mm), or less than 1.2 mils (0.030 mm).

In one embodiment, the liner is an ultrathin or ultra light liner having a thickness of less than 1.02 mil (0.0254 mm), less than 1 mil (0.0254 mm), less than 0.92 mil (0.0233 mm), less than 0.8 mil (0.0203 mm), less than 0.6 mil (0.017 mm), less than 0.50 mil (0.013 mm), or equal to or less than 0.25 mil (0.00626 mm) Such thin liners are commercially available as Hostaphan® polyester film (e.g., 0.5 mil, 0.0127 mm, Tradename 2SLK silicone coated film) sheeting from Mitsubishi Chemical Company. Another liner material is provided by Avery Dennison as a 1.02 mil (0.026 mm) polyester backing sheet with a 1.25 mil (0.032 mm) adhesive layer.

In another embodiment, the label stock or web of label stock is linerless and comprises a facestock and a pressure sensitive adhesive layer adhered to the facestock, with no release liner adhered to the adhesive layer. The linerless label stock consists essentially of a facestock and a pressure sensitive adhesive layer adhered to one side of the facestock and a release coating on the other side of the facestock.

Figure 2:
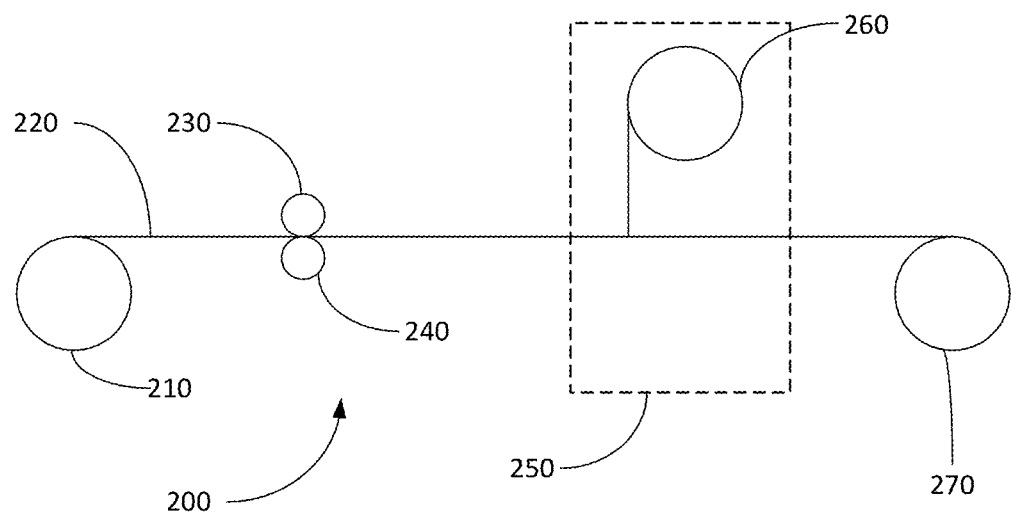
FIG. 2 is a schematic of a label converting system that includes the operations of cutting and matrix stripping.

Referring to FIG. 2, a label cutting system 200 generally comprises a feed roll 210 that feeds the label stock 220 to a cutting die 230 supported by anvil 240, where the label stock is cut into labels (cut label stock). The cut label stock is then fed to a matrix removal station 250 where the matrix is delaminated from the cut label stock and fed to a matrix winder 260. The cut labels are then fed to a label rewind 270. The present technology provides an apparatus and method for application in the matrix removal station 250 to separating and removing the matrix material from the web of die-cut labels.

The labels can be cut by any suitable process or cutting device and system. In one embodiment, the cutting process is performed without removing the liner prior to die-cutting the labels. In another embodiment, the liner can be temporarily removed and a temporary support can be applied to the adhesive. The support can be removed after die-cutting and the label reapplied. In one embodiment, the labels can be cut using a system as described in U.S. patent application Ser. No. 13/003,771, the disclosure of which is incorporated herein by reference in its entirety.

In accordance with aspects of the present invention, the matrix removal station and method for stripping the matrix from a die-cut label stock comprises providing a web die-cut label stock to a rotating cylinder, applying an electrostatic charge to the web of die-cut label stock being conveyed along the rotating cylinder, and applying a force to a surface of the die-cut label stock to guide the matrix and the web comprising the die-cut label and liner in divergent paths. Applying the electrostatic charge to the web of cut label stock assists in holding the web against the rotating cylinder as it is conveyed and as the force is applied to guide the matrix and the label/liner web in divergent paths. The system can be operated such that the liner side or the facestock side of the web of the die-cut label stock is held against the rotating cylinder.

Figure 3:
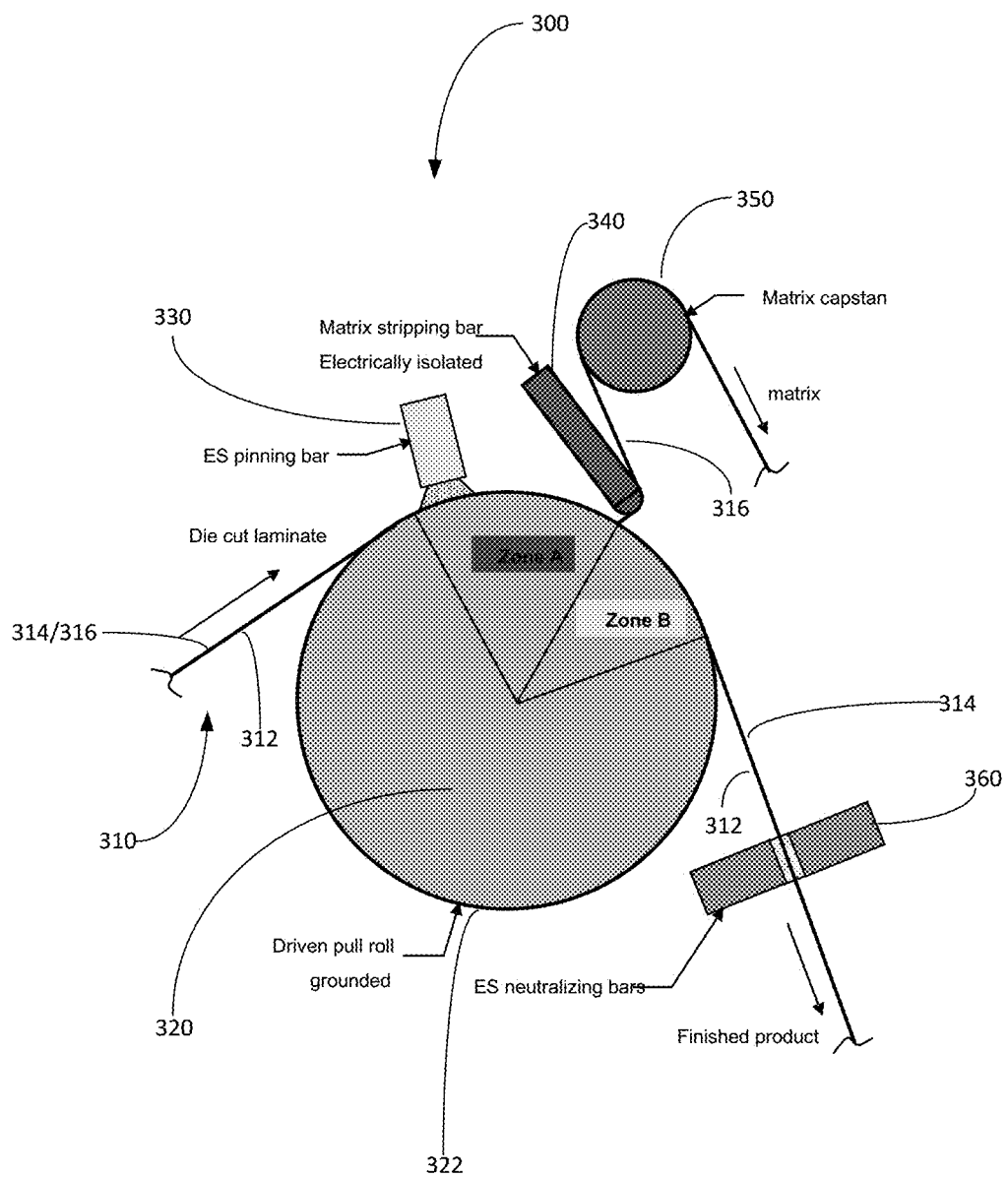
FIG. 3 is a schematic of a matrix stripping portion of a label converting system in accordance with an embodiment of the technology.

FIG. 3 illustrates an embodiment of a matrix removal station 300 and method for stripping the matrix from a die-cut label stock. The station 300 comprises a rotating cylinder 320 that receives a web of cut label stock 310. The rotating cylinder 320 can be a driven pull roll. In the embodiment of FIG. 3, the label stock is oriented such that liner surface 312 contacts the surface of the rotating cylinder 320, and the die-cut label surface comprising label segments 314 and matrix 316 do not contact the surface 322 of cylinder 320. As the label stock is fed along the cylinder 320, an electrostatic charge is applied to the web 310 via a source of electrostatic charge, e.g., an electrostatic pinning bar 330. Downstream of applying the electrostatic charge, a force is applied to the surface of the label stock to cause the matrix and the label/liner to move in divergent paths such that the matrix is removed away from the die-cut label stock. A member 340 such as a stripping bar, nip roll, etc., functions to establish the point of divergence between the matrix and the die cut label stock, while the matrix capstan 350 applies a tension to the matrix and thereby pulls the matrix away from the die-cut label stock toward a matrix removal system (not shown). The label stock from which the matrix has been removed is pulled toward a rewind roll for the finished product. The finished product comprising the labels 314 and the liner 312 passes through an apparatus (e.g., neutralizing bar or bars 360) to neutralize or remove the electrostatic charge from the die cut label stock.

While not being bound to any particular theory, application of the electrostatic charge has the effect of assisting to pin or hold the liner web against the surface of the roll. This reduces the likelihood or occurrence of the liner being separated from the pull roll due to the matrix stripping force. A shear energy is also believed to be present, which creates traction and prevents the web from sliding on the roll.

The electrostatic charge and neutralization bars can be provided by any suitable device or system including those available from Simco-Ion Industrial Group, Simco-Ion Technology Group, TAKK Industries Incorporated, HAUG Static Control Products, AiRTX International, EXAIR Corporation, etc. The electrostatic charge can be provided by ionized air. The electrostatic charge required to sufficiently pin the web to the roll will vary based on the dielectric attributes of the web. The apparatus for providing the electrostatic charge can vary the power output to vary the electrostatic force.

Figure 4:
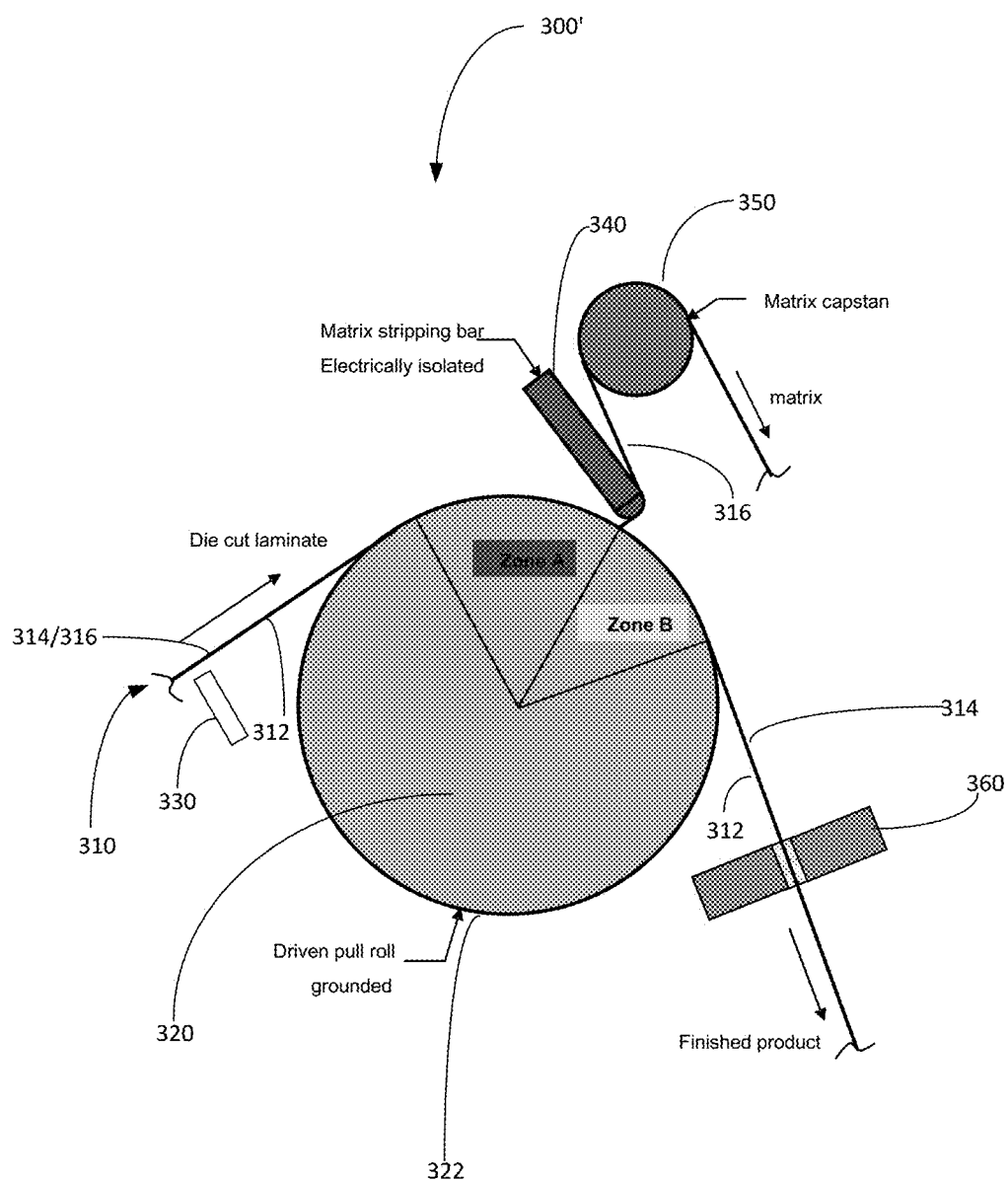
FIG. 4 is a schematic of a matrix stripping portion of a label converting system in accordance with an embodiment of the technology in FIG. 3, where the electrostatic charge source is positioned in a different location relative to the rotating cylinder.

FIG. 3 illustrates the electrostatic pinning bar being positioned external to the cylinder 320. In another embodiment, the electrostatic pinning bar can be positioned internal to the cylinder 320. In this internal configuration, the electrostatic pinning bar can provide a charge opposite the charge of an electrostatic pinning bar located external to the cylinder. This internal configuration pulls the liner 312 toward the cylinder 320. In another embodiment illustrated in FIG. 4, the matrix removal station 300' has the electrostatic pinning bar 330 positioned to apply a charge to the web prior to the web engaging roll 320. In this embodiment, the electrostatic charge is applied to the liner, which will contact the roll 320.

The guide member (which may also be referred to as a "stripping member"), such as member 340, can be provided by a stripping bar, nip roll, etc. In one embodiment, the guide member is electrically isolated. The guide member can comprise a rubber material with a high dielectric constant.

Figure 5:
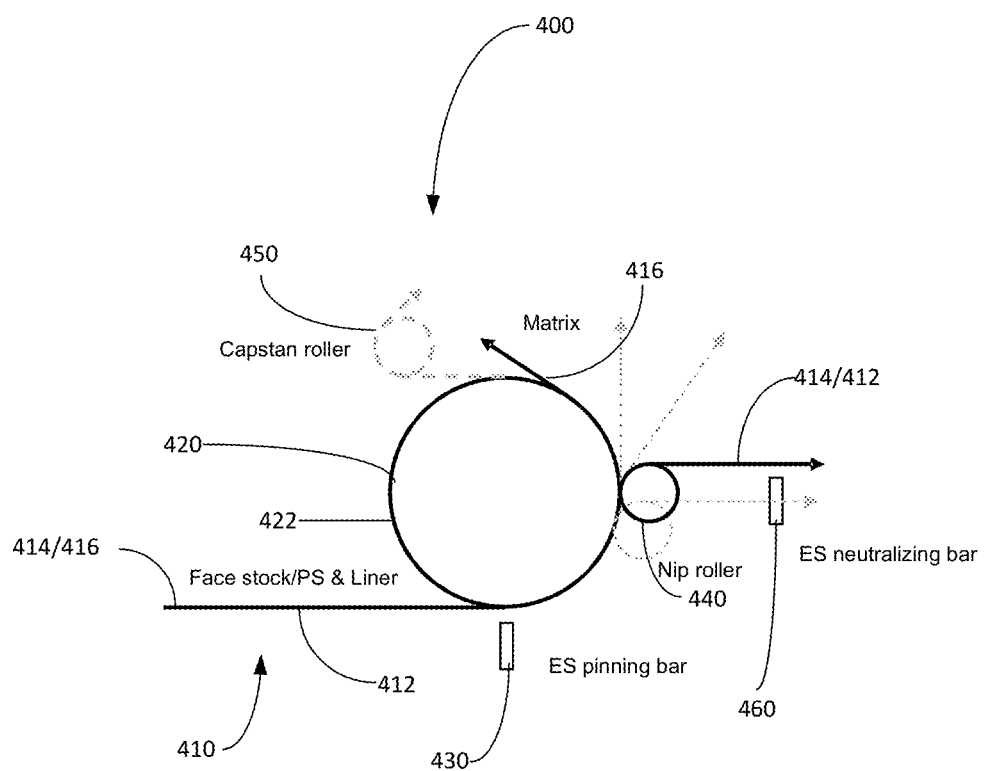
FIG. 5 is a schematic of a matrix stripping portion of a label converting system in accordance with an embodiment of the technology.

FIGS. 5-10 illustrate alternate embodiments of a matrix removal station configured for having the facestock oriented to contact the rotating cylinder. FIG. 5 illustrates a matrix removal station 400 where the die-cut label stock 410 is fed to a rotating cylinder (e.g., a pull roll) 420. In this embodiment, the label stock 410 is oriented such that the facestock surface comprising the labels/matrix 414/416 is oriented to contact the surface of the cylinder 420, and the liner 412 is not in contact with the surface 422 of cylinder 420. An electrostatic charge is applied to the die-cut label stock by a source 430 for imparting an electrostatic charge. The source 430 can be, for example, an electrostatic pinning bar. The electrostatic charge facilitates pinning or holding the label stock to the cylinder 420. The web proceeds along cylinder 420 toward nip roll 440. The nip roll 440 functions to establish the point of divergence between the liner 412 and labels 414, also known as the label stock, and the matrix 416, which remains "pinned" against the cylinder 420. The matrix is held in position on the cylinder 420 and is separated by the tension force applied by the pull from the capstan roller 450 for transport to a matrix removal system. The liner/label stock 412/414 is passed along toward a rewind roll. The liner/label stock 412/414 is passed through a neutralizer 460 to remove the static charge from the liner/label stock.

The matrix removal station of FIG. 5 is particularly suitable for removing the matrix from label stock having a relatively thin facestock. By holding the matrix against the cylinder 420, the matrix has the stability of a continuous web during separation from die-cut label/matrix web, and the matrix geometry is less of a factor in matrix removal. Tension management of the matrix is better controlled and is not a function of the matrix changing shape as it separates from the label.

Figure 6:
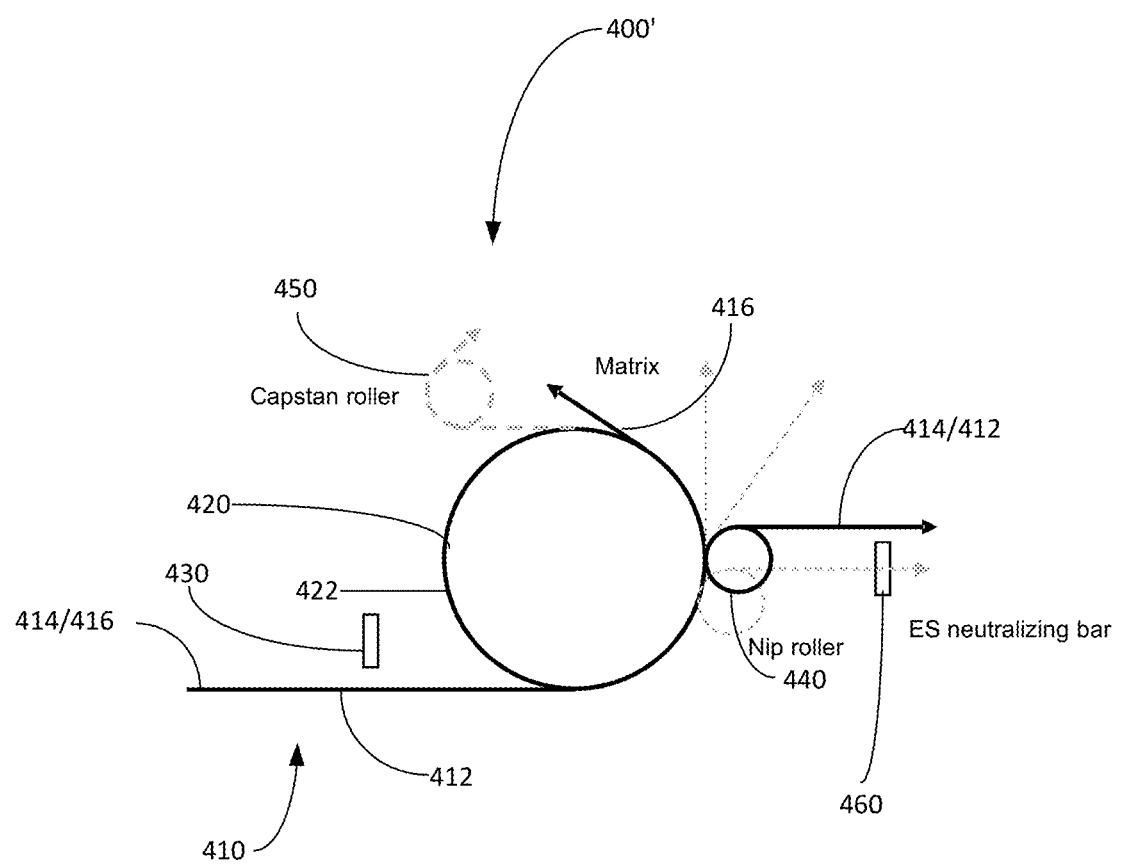
FIG. 6 is a schematic of a matrix stripping portion of a label converting system in accordance with the embodiment of FIG. 5 where the electrostatic charge source is positioned in a different location relative to the rotating cylinder.
Figure 7:
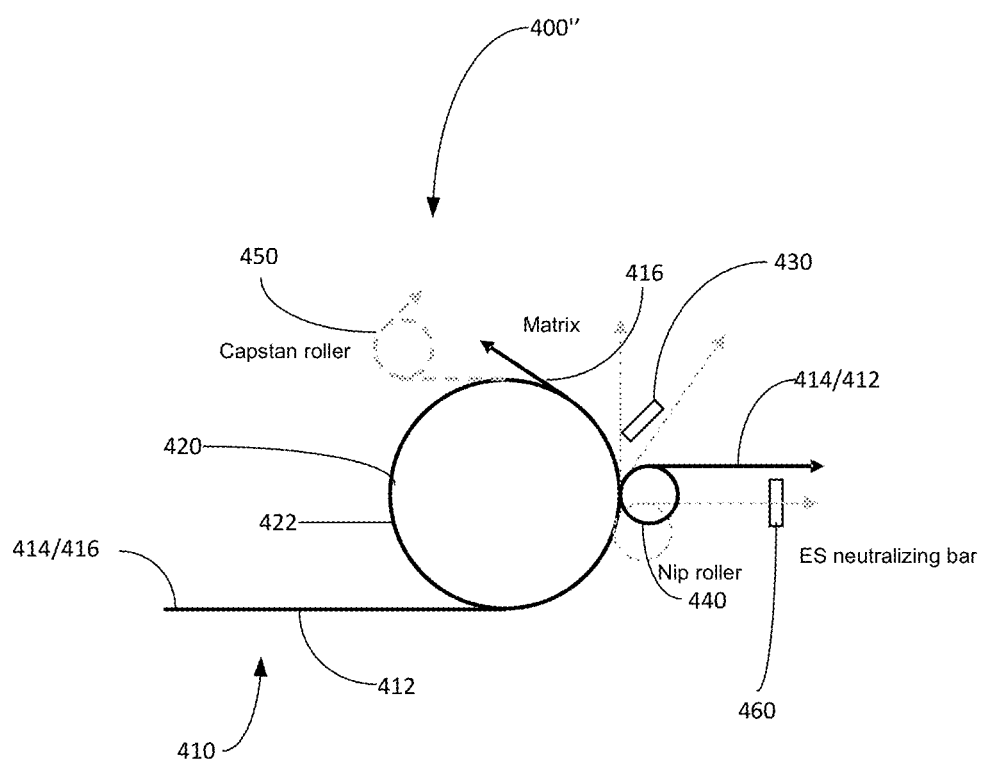
FIG. 7 is a schematic of a matrix stripping portion of a label converting system in accordance with the embodiment of FIG. 5 where the electrostatic charge source is positioned in a different location relative to the rotating cylinder.

Similar to the embodiment of FIG. 3, the electrostatic pinning bar 430 can be positioned external or internal to the rotating cylinder 420. FIGS. 6 and 7 illustrate embodiments in which the electrostatic pinning bar is positioned at a different location relative to the rotating cylinder. In FIG. 6, the matrix removal station 400' has the electrostatic pinning bar 430 positioned prior to the web contacting the rotating cylinder 420. The electrostatic pinning bar 430 is positioned to apply an electrostatic charge to the side of the web, the matrix/label side 414/416 in this instance, that will contact the rotating cylinder 420. In FIG. 7, the removal station 400" has the electrostatic pinning bar 430 positioned at a location downstream of the nip roller 440. In this embodiment, the electrostatic pinning bar applies a charge to the matrix that has been removed and pins the matrix against the cylinder 420. This still provides a suitable effect for the purpose of facilitating removal and subsequent transport of the matrix, or any combination thereof.

Figure 9:
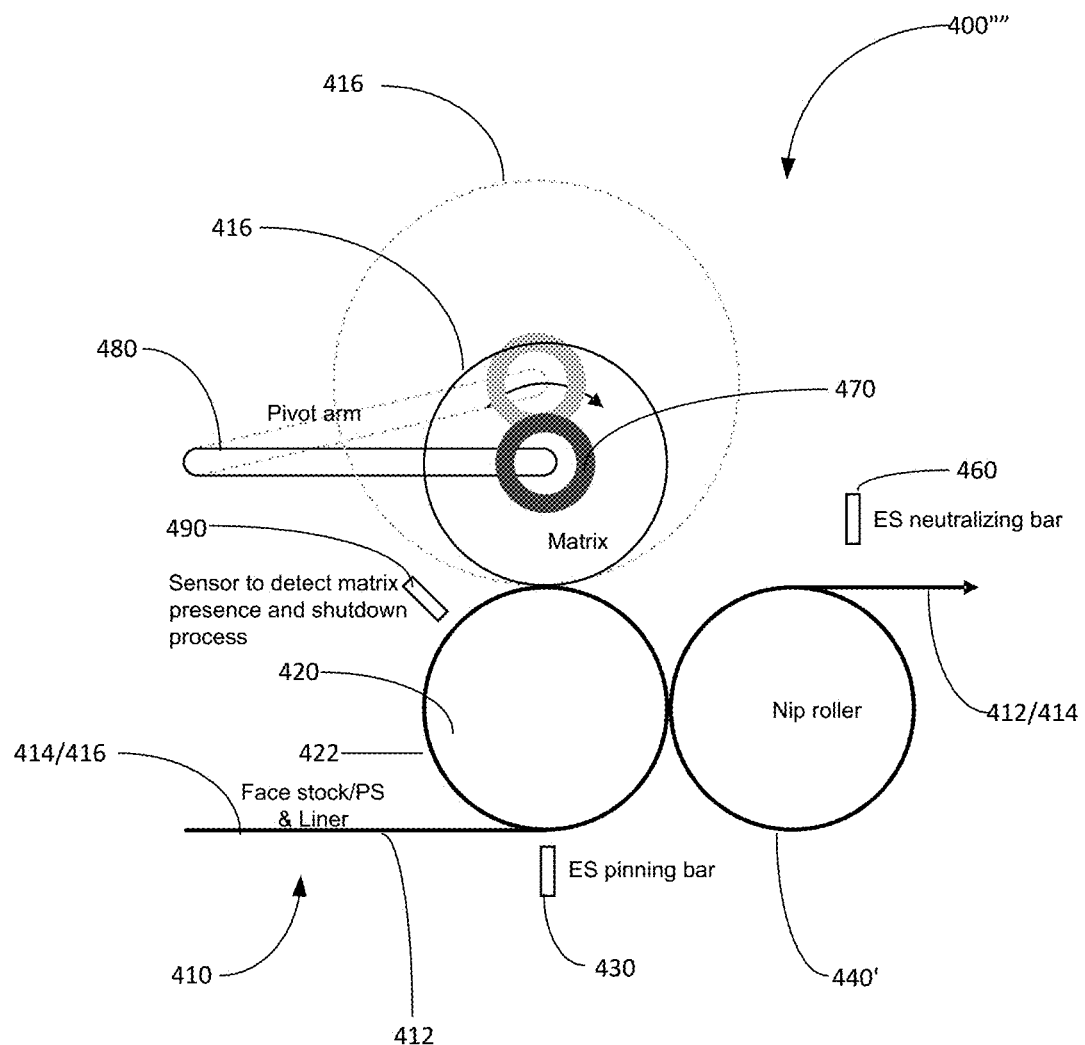
FIG. 9 is a schematic of a matrix stripping portion of a label converting system in accordance with the embodiment of FIG. 5 showing an alternative guide member.

The nip roller 440 can be electrically isolated by employing a material with a high dielectric constant, e.g., a rubber. The nip roller 440 can be positioned at various locations proximate to the pull roll 420, and the liner peel angle changed or controlled as desired for a particular purpose. Additionally, the size of the nip roll 420 is not particularly limited and can be chosen as desired to facilitate separation of the label/liner web from the matrix. In FIG. 9, for example, the matrix removal station 400'''' comprises a nip roller 440' having a larger diameter than the nip roller 440 in FIG. 5. The size of nip roller 440, 440', etc. can be selected based on the size or weight of the label/liner web. While the embodiments illustrated show the use of a nip roller, it will be appreciated that separation of the matrix material from the label/liner web can be facilitated with any suitable device for applying a force to separate the respective layers. In one embodiment, a stripping bar positioned in proximity to the rotating cylinder 420 can be used to separate the label/liner web from the matrix.

Figure 8:
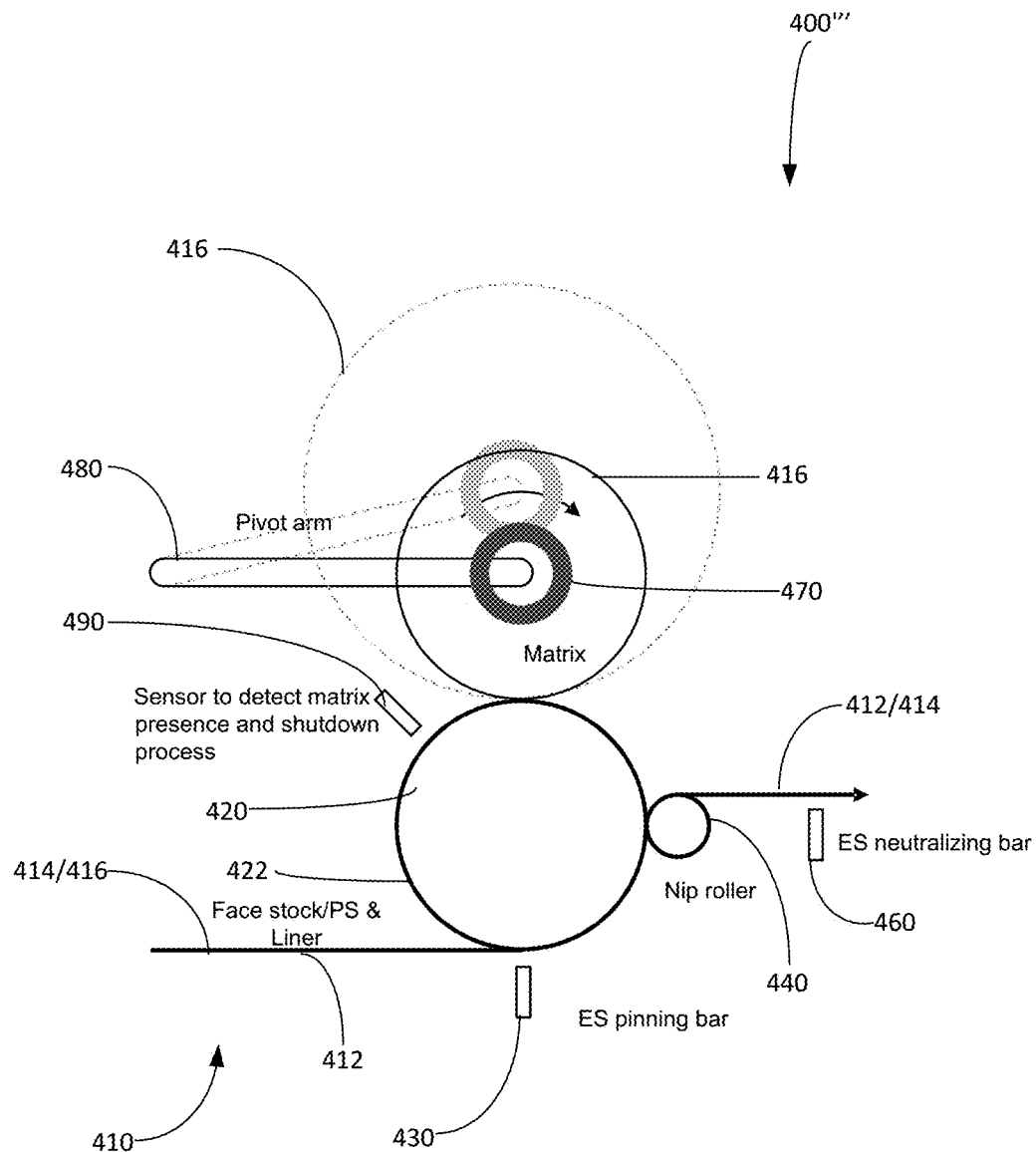
FIG. 8 is a schematic of a matrix stripping portion of a label converting system in accordance with the embodiment of FIG. 5 showing an alternative matrix winding system.
Figure 10:
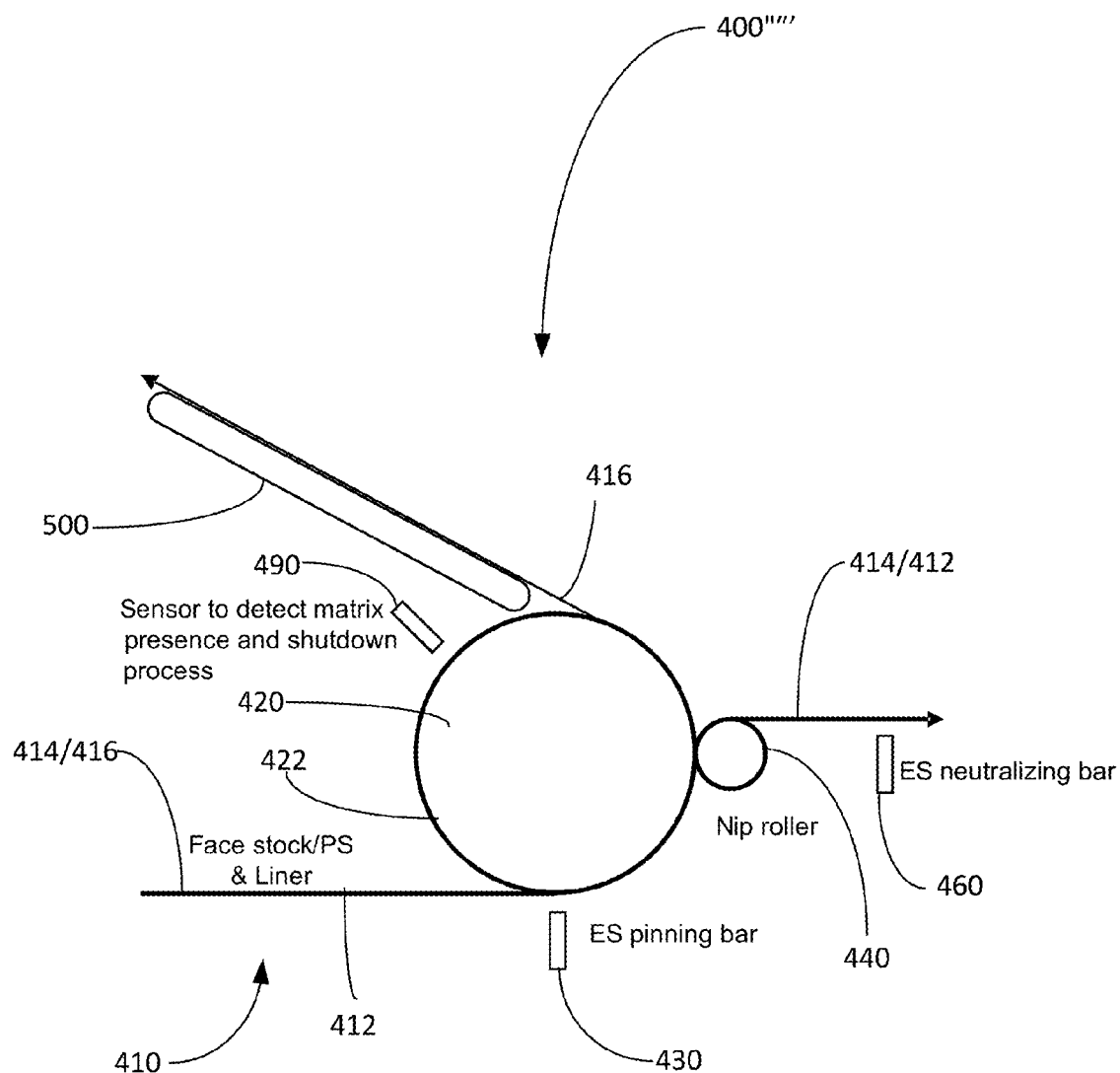
FIG. 10 is a schematic of a matrix stripping portion of a label converting system in accordance with the embodiment of FIG. 5 showing an alternative apparatus for transporting the matrix after it is removed from web.

FIGS. 8-10 illustrate a matrix removal station with various embodiments for transporting the matrix. FIGS. 8 and 9 illustrate matrix removal stations 400''' and 400'''', respectively, comprising a rewind spindle or roll 470 attached to a pivot arm 480. The matrix material is transported and wound around roll 470. As the diameter of the wound matrix material grows, the pivot arm pivots to accommodate the growing matrix roll. The position of the pivot arm can be automatically controlled and adjusted by an algorithm taking into account the caliper of the matrix material's thickness and the rollers speed. As shown in FIGS. 8 and 9, the system can also include a sensor 490 to detect the matrix presence. The sensor can relay a signal to a controller to shut down the process when matrix material is not detected indicating breakage of the matrix material.

In FIG. 10, the matrix removal station 400'''' comprises a conveyor 500 for transporting the matrix web 416. The conveyor provides for continuous support of the matrix web toward the rewind roll, which further relieves the tension in the matrix web.

While various embodiments show transport of the matrix to a matrix removal system such as roll for collection and subsequent disposal or recycling of the matrix material, it will be appreciated that the matrix can be transported to any suitable system, apparatus, or location for collection and disposal.

In the various embodiments, the peel or stripping angle can be chosen as desired for a particular application.

The matrix removal systems and methods allow for improved handling and removal of matrix material from a web of cut label stock. Charging the web facilitates holding the web against the rotating cylinder prior to and during application of a suitable force to cause the matrix and label/liner web to delaminate from each other.

While the invention has been described in relation to various aspects and embodiments, it is appreciated that various modifications may become apparent to those skilled in the art upon reading the specification. The subject matter described herein is intended to cover such modifications as fall within the scope of the appended claims.

What is claimed is:

1. An apparatus for forming cut adhesive backed labels on a liner comprising:
    a cutting station for forming a plurality of cut adhesive backed labels and a surrounding matrix from a web of label stock comprising a facestock, an adhesive layer, and a liner; and
    a matrix removal station for removing the matrix from the cut adhesive backed labels and the matrix on the liner, the matrix removal station including
        a cylinder for receiving a cut label stock comprising the cut adhesive backed labels, the matrix, and the liner;
        a source for applying an electrostatic charge to the cut label stock;
        a member for contacting a surface of the cut label stock to cause separation of the matrix from the adhesive backed labels and the liner; and
        a member for neutralizing cut label stock bearing the adhesive backed labels and the liner from which the matrix has been removed,
    wherein the member for contacting the surface of the label stock is electrically isolated.

2. The apparatus of claim 1, wherein the member for contacting a surface of the label stock comprises a dielectric material.

3. The apparatus of claim 1, wherein the member for contacting a surface of the label stock comprises a matrix stripping bar, and the cut label stock is oriented such that the liner contacts the cylinder.

4. The apparatus of claim 1, wherein the member for contacting a surface of the label stock comprises a nip roller, and the cut label stock is oriented such that the matrix and the cut adhesive backed labels contacts a surface of the cylinder.

5. The apparatus of claim 4, wherein the nip roller has a diameter smaller than the diameter of the cylinder for receiving a cut label stock.

6. The apparatus of claim 5, wherein the matrix removal station further comprises a matrix rewind roll for receiving the matrix material separated from the cut label stock.

7. The apparatus of claim 6, wherein the matrix rewind roll is attached to a pivot arm.

8. The apparatus of claim 4, wherein the nip roller has a diameter substantially similar to the diameter of the cylinder for receiving a cut label stock.

9. The apparatus of claim 1, wherein the matrix removal station comprises a conveyor belt positioned along the cylinder for receiving a cut label stock, the conveyor belt adapted to receive and carry the matrix material removed from the cut label stock to a matrix removal system.

10. A method of removing a matrix material from a web of cut label stock comprising:
    providing a web of cut label stock to a rotating cylinder, the cut label stock comprising a facestock comprising cut label stock and a matrix, an adhesive layer in contact with the facestock, and a release liner in contact with the adhesive layer and opposite the facestock, where the facestock or the release liner contacts an outer surface of the cylinder;
    applying an electrostatic charge to the web of cut label stock in contact with the rotating cylinder; and
    contacting a surface of the cut label stock that is not in contact with the rotating cylinder with a separation member causing separation of the matrix from the cut label stock,
    wherein the separation member is electrically isolated.

11. The method of claim 10 further comprising feeding the cut label stock from which the matrix has been separated to a label rewind roll.

12. The method of claim 11 further comprising neutralizing the cut label stock from which the matrix has been separated prior to rewinding the cut label stock.

13. The method claim 10, wherein the separation member comprises a rubber material.

14. The method of claim 10, wherein web of label stock is provided such that the release liner contacts the rotating cylinder.

15. The method of claim 14, wherein the separation member comprises a matrix stripping bar.

16. The method of claim 10, wherein the web of label stock is provided such that the facestock contacts the rotating cylinder.

17. The method of claim 10, wherein the separation member comprises a nip roller.

18. The method of claim 17, wherein the nip roller has a diameter smaller than the diameter of the rotating cylinder.

19. The method of claim 18, wherein the facestock has a thickness of less than 0.25 mil to 10 mils.

20. The method of claim 17, wherein the nip roller has a diameter that is about the same as a diameter of the rotating cylinder.

21. The method of claim 10, wherein the matrix remains associated with the rotating cylinder upon separation of the matrix from the cut label stock and is fed to a matrix rewind roll.

22. The method of claim 21, wherein the matrix rewind roll is connected to a pivot arm that pivots away from the rotating cylinder as the diameter of the matrix material increases on the matrix rewind roll.

23. The method of claim 10, further comprising feeding the matrix material that is separated from the label stock to a conveyor belt positioned along the rotating cylinder, and feeding the matrix material from the conveyor belt to a matrix removal system.

24. The method of claim 10, wherein the source for applying an electrostatic charge to the web of cut label stock is positioned external to the rotating cylinder.

25. The method of claim 10, wherein the source for applying an electrostatic charge to the web of cut label stock is positioned internally in the rotating cylinder.

* * * * *